United States Patent [19]

Nutter

[11] 4,396,559
[45] * Aug. 2, 1983

[54] GAS-LIQUID CONTACT APPARATUS

[76] Inventor: Dale E. Nutter, 7935 S. New Haven St., Tulsa, Okla. 74136

[*] Notice: The portion of the term of this patent subsequent to Jul. 13, 1999, has been disclaimed.

[21] Appl. No.: 396,558

[22] Filed: Jul. 9, 1982

Related U.S. Application Data

[63] Continuation-in-part of Ser. No. 267,494, May 27, 1981, Pat. No. 4,339,399.

[51] Int. Cl.³ .............................................. B01F 3/04
[52] U.S. Cl. ..................................... 261/112; 261/113
[58] Field of Search .................... 261/112, 113, 114 R

[56] References Cited

U.S. PATENT DOCUMENTS

| | | | |
|---|---|---|---|
| 100,766 | 3/1870 | Huntington | 261/114 R |
| 556,811 | 3/1896 | Dold | 261/114 R |
| 1,118,267 | 11/1914 | Burhorn | 261/114 R |
| 2,591,343 | 4/1952 | Eld | 261/114 R |
| 2,661,197 | 12/1953 | Norman | 261/112 |
| 2,885,195 | 5/1959 | Haselden | 261/112 |
| 2,998,234 | 8/1961 | Haselden | 261/113 |
| 3,039,749 | 6/1962 | Kohl et al. | 261/112 |
| 3,079,134 | 2/1963 | Winn | 261/113 |
| 3,112,261 | 11/1963 | Porter et al. | 261/112 |
| 3,222,040 | 12/1965 | Eckert | 261/113 |
| 3,343,821 | 9/1967 | Winn et al. | 261/112 |
| 3,533,609 | 10/1970 | Brandt et al. | 261/113 |
| 3,647,191 | 3/1972 | Fordyce | 261/113 |
| 4,171,333 | 10/1979 | Moore | 261/113 |

FOREIGN PATENT DOCUMENTS

| | | | |
|---|---|---|---|
| 57796 | 9/1912 | Austria | 261/112 |
| 3002385 | 9/1980 | Fed. Rep. of Germany | 261/112 |
| 310032 | 9/1955 | Switzerland | 261/113 |
| 2000048 | 1/1979 | United Kingdom | 261/112 |

*Primary Examiner*—Tim R. Miles
*Attorney, Agent, or Firm*—Beveridge, DeGrandi and Kline

[57] ABSTRACT

This vapor-liquid contact apparatus, suitable for use in fractionating tower sections, includes a plurality of grids which are arranged in a vertical stack. Each grid is formed of a plurality of parallel, horizontal elongated segments; and, the longitudinal axes of the segments are angularly turned relative to the segment axes in the grid therebeneath.

Each segment has an upstanding flange which supports a downflowing film of liquid, and a trough portion for receiving liquid which has flowed from the flange. The trough portion is provided with liquid drain openings which are located to release liquid directly onto contacting upper edges of the flanges of the next lower grid. A plurality of connector portions, integral with and bent outwardly from the flange portions, are spot welded to the trough portions to interconnect these elements.

The gas flows upwardly through openings which are provided between the flanges and troughs of the segments. The ascending gas strikes a blunt nose formed by the lower surface of the trough, giving the gas a slight angular velocity without a substantial pressure drop, and promoting the contact of the gas with the liquid film on the flange.

19 Claims, 7 Drawing Figures

FIG.1
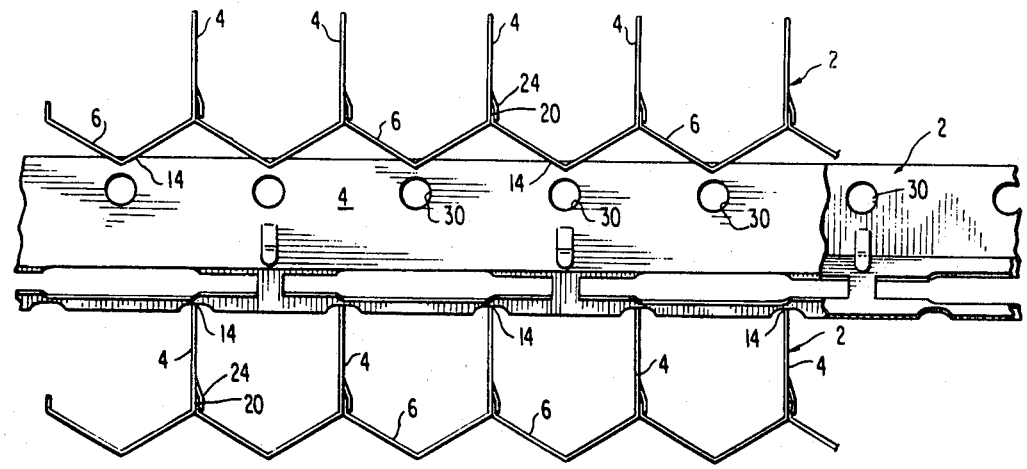
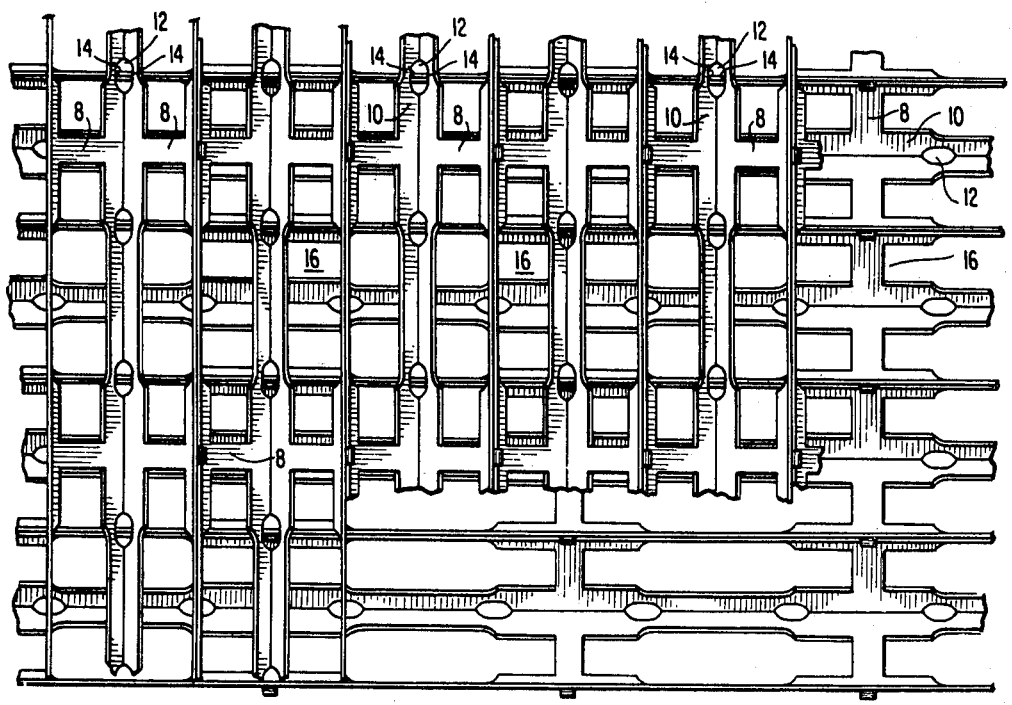
FIG.2
FIG.5
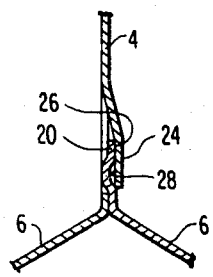

GAS-LIQUID CONTACT APPARATUS

REFERENCE TO RELATED APPLICATION

This is a continuation-in-part of copending U.S. patent application Ser. No. 267,494 filed May 27, 1981, now U.S. Pat. No. 4,339,399 for gas-liquid contact apparatus, the content of which is incorporated herein by reference.

BACKGROUND OF THE INVENTION

This invention relates to improved gas-liquid contact apparatus in which a fractionation tower or other vessel is provided with a packing formed of a vertical stack of grids.

Packing materials are used in chemical processing apparatus to provide (a) a supporting surface for the downward flow of liquid and (b) openings for the upward flow of gases. Liquid which is introduced to the upper end of the packing flows downwardly as a thin film on the surfaces of the packing material. Gaseous vapors are injected into the lower end of the vessel and ascend through the openings in the packing material, moving through the vessel in intimate contact with the liquid film on the surface of the packing. Such contact between the liquid and gas can produce mass transfer, a chemical reaction, heat exchange and/or scrubbing of the gaseous stream.

The invention described in this specification is primarily envisioned for use in heat exchange sections of fractionation towers, such sections usually being located where there is a liquid flow rate in relation to the gas flow rate. This occurs in pump-around sections and flash sections of vacuum fractionating towers where direct contact between the vapor and the liquid are used to remove heat from the ascending vapor. Ideally, this can be achieved with a minimal amount of entrainment of liquid droplets into the gaseous stream, a minimal pressure differential between the incoming gases and the outgoing gases, and a continuous downward flow of liquid which assures that effective heat exchange will continue throughout a wide range of gas flow rates.

A variety of packings are available for the heat exchange sections of fractionation towers but, to the inventor's knowledge, all fall short of meeting the ideal characteristics listed above. Such packings may provide downwardly-facing surfaces which are shaped or dimensioned so as to provide an undue pressure drop in the gaseous stream, they may inherently release liquid droplets which cause splashing and promote entrainment of liquid in the gaseous stream, or they may have other shortcomings. The objectives of the present invention are to provide a superior packing material which deters entrainment, minimizes pressure drop and provides an effective contacting relationship between the gas and liquid.

A single-layer liquid distributor for use with random packings is disclosed by the Moore et al U.S. Pat. No. 4,171,333. Some earlier packing materials are disclosed in the following U.S. Patents:

U.S. Pat. No. 100,766, Huntington
U.S. Pat. No. 556,811, Dold
U.S. Pat. No. 1,118,267, Burhorn
U.S. Pat. No. 2,591,343, Eld
U.S. Pat. No. 2,885,195, Haselden
U.S. Pat. No. 2,998,234, Haselden
U.S. Pat. No. 3,533,609, Brandt et al.
U.S. Pat. No. 3,079,134, Winn
U.S. Pat. No. 3,343,821, Winn et al.

A primary objective of the present invention is to provide a packing which is effective and results in minimal gaseous pressure drop and a minimal entrainment. Additionally, it is an objective to provide a packing which is relatively uncomplicated, easily manufactured and structurally sound.

The invention claimed in this application is an improvement to the packing disclosed in U.S. patent application Ser. No. 267,494 filed May 27, 1981. However, in addition to the attributes of the previously disclosed packing, the present invention provides a packing which requires less material for manufacture.

SUMMARY OF THE INVENTION

In one respect, the present invention involves a gas-liquid contact apparatus in which each grid in a vertical stack has a plurality of parallel elongated upstanding flanges, a plurality of trough portions which lie between the flanges and extend parallel thereto and a plurality of gas openings which are located between the trough portions and the flanges to permit an ascending stream of gas to flow over and in contact with a film of liquid which is disposed on the flanges. The trough portions each lie in contact with the upper edges of the flanges on the next lower grid, and liquid drain openings are provided in the troughs where they contact the flanges of the next lower grid so that liquid in the troughs will drain gravitationally onto the flanges of the next lower grid. To conserve material during fabrication, the flanges are connected to the trough portions by a plurality of connector portions which are integral with and bent outwardly in opposite directions from their respective flanges.

In another respect, the invention involves a grid formed of a group of segments which each have a bottom wall and at least one upstanding flange. The bottom wall is formed of a trough portion and a plurality of spaced apart connector portions which collectively provide an upward liquid-supporting surface which is sloped downwardly to a lowermost liquid-releasing distribution point on the flange. To conserve material during fabrication, the flanges are connected to the trough portions by a plurality of connector portions which are integral with and bent outwardly in opposite directions from their respective flanges. The distribution point is in contact with an upper edge of an upstanding flange of a grid therebelow so that liquid from the distribution point will flow onto the upstanding flange therebelow. The bottom wall has gas openings which lie between the flange, connector portions and trough portion. The connector portions are located where they will be struck by liquid which may fall through the openings of the grids thereabove and, due to the sloping of these connector portions downwardly to the trough portions, they carry to the distribution points both the liquid which flows onto the connector portions from the upstanding flange and the liquid which strikes the connector portions.

From another perspective, the invention relates to gas-liquid contact apparatus in which each grid in a vertical stack of grids is formed of a plurality of segments which have longitudinal axes which are parallel to each other and are angularly tuned relative to the segments in the grid therebeneath. Each segment has a trough portion, a flange portion and connector portions. The trough portions extend longitudinally of the segments and they are provided with a first set of spaced apart openings which are drain openings for the gravitational drainage of liquid therefrom. The flange portions have upstanding orientations and they extend longitudinally of their respective segments. The flange portions are spaced from the trough portions, and they have surfaces for supporting thereon a downwardly-flowing film of liquid. The connector portions are integral with the flanges, and they are bent outwardly from their respective flanges in opposite directions. The connector portions are longitudinally spaced apart on their respective segments and they are connected to the trough portions. The connector portions slope downwardly from the flange portions to the trough portions and they have surfaces for carrying liquid from the flange portions to the trough portions.

Between the spaced apart connector portions, there is a set of gas openings which permit a stream of gas to pass upwardly through the segments in contact with the liquid on the wall portions. The drain openings in each grid have edges which lie in contact with the flange portions of the grid therebeneath so that liquid will flow from the troughs of one grid on to the upstanding flanges of the grid therebeneath.

There are also a number of preferred features according to the invention. For example, to minimize pressure drop and to enhance the effectiveness of the gas-liquid contact, each of trough portions has a lower surface which is rounded to provide a blunt nose for diverting the ascending gas toward the gas openings. In its preferred form, the gas openings in each grid have an area which a vertical projection is at least 60% of the total area of the grid in vertical projection. The drain openings are preferably spaced apart a distance which is equal to the spacing between the upper edges of the upstanding flanges of the given segment. Each trough is located midway between two of the flanges. To promote the distribution of liquid across the surface of the flanges, it is desirable to provide the flanges with holes which lie directly below the drain openings of the grid thereabove. These holes are operable to divert the film of liquid across the surface of the flange.

THE DRAWINGS

FIGS. 1–5 are identical to the drawings in prior U.S. patent application Ser. No. 267,494 filed May 27, 1981, and the improved construction of the present invention is shown in FIGS. 6 and 7.

FIG. 1 is a side elevation showing three vertically stacked grids.

FIG. 2 is a plan view of the three grids shown in FIG. 1.

FIG. 3 is a view of a blank which, after being appropriately bent into configuration, will provide a grid segment for use in constructing the grids of FIG. 1.

FIG. 4 is a perspective view showing a partially disassembled upper grid and its relationship to a lower grid therebeneath.

FIG. 5 is a sectional view showing the manner in which two adjacent grid segments are interconnected.

DESCRIPTION OF THE INVENTION

FIGS. 1 and 2 show a vapor liquid contact apparatus in which three generally horizontal grids 2 are arranged in a vertical stack. Each grid has a plurality of longitudinally extending parallel upstanding flanges 4 which are preferably vertical and provide the primary surfaces for supporting the liquid during its contact with the ascending gas stream. Beween each pair of flanges 4, there are longitudinally extending bottom walls 6 which slope downwardly in a shallow V-shape at an inclination angle which preferably is no greater that about 30°. The upper surfaces of the bottom walls 6 are utilized to support downflowing liquid, preventing the introduction of the liquid into the gaseous stream and directing the liquid to a distribution point where it will be able to flow directly onto the flanges of the next lower grid 2.

Figure 4:
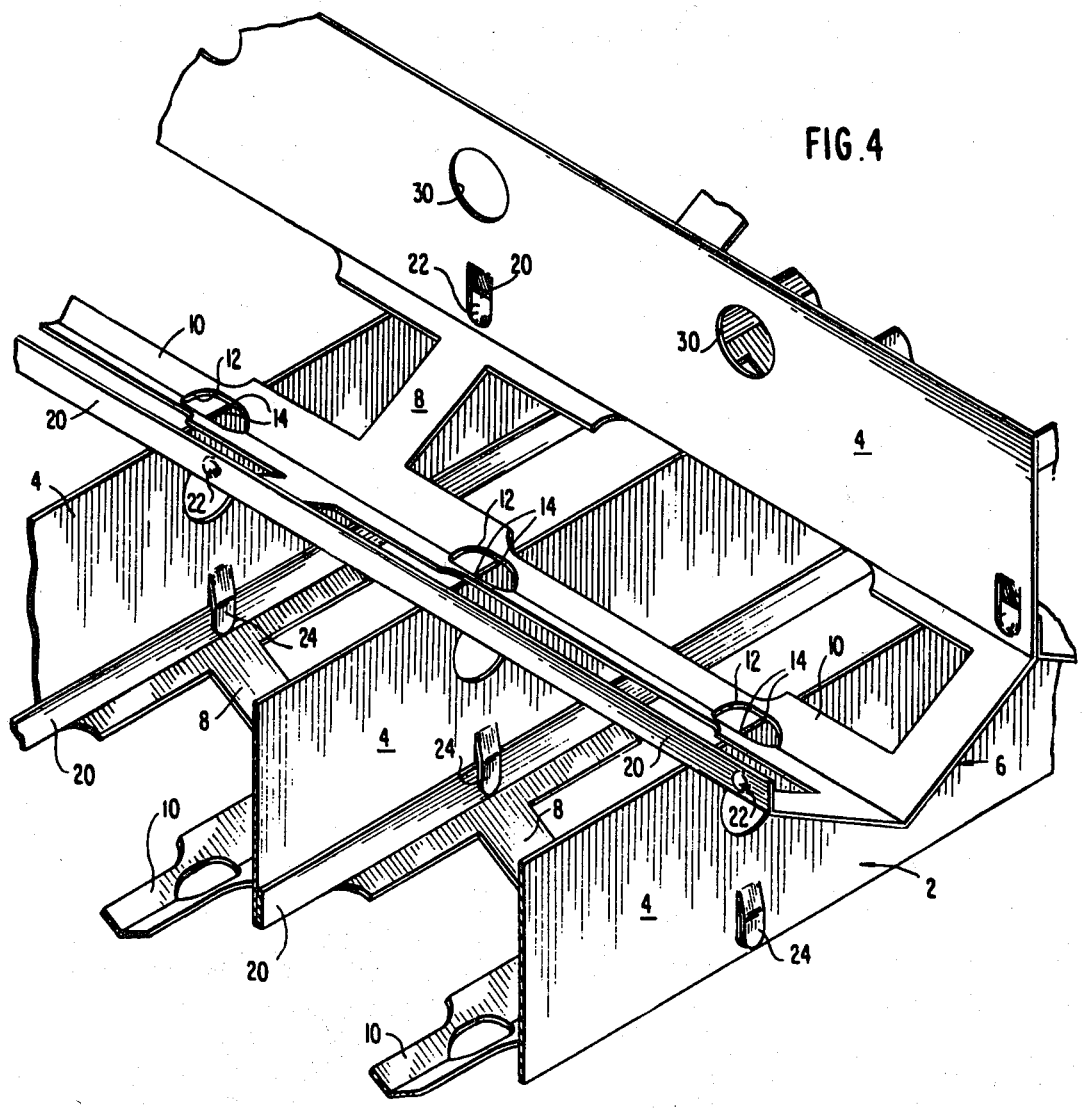

More specifically, as shown in FIGS. 2 and 4, the bottom wall has a plurality of longitudinally spaced sloped connector portions 8 and longitudinally extending parallel trough portions 10 which preferably lie midway between the flanges 4. Each of the trough portions 10 is provided with a plurality of liquid drain openings 12, the edges of which lie in contact with the upstanding flange portions 4 of the next lower grid. This provides a number of distribution points 14 where liquid flows from the troughs 10 of one grid directly onto the upstanding flanges 4 of the grid therebeneath.

As shown in FIG. 2, the gas openings 16 are relatively large. They are located in the bottom walls 6 and they are bounded by the connector portions 8, the troughs 10 and the upstanding flanges 4. The precise configuration of these openings 6 is not considered critical, and it is believed that the apparatus will work equally well if not better if each of the illustrated generally rectangular openings were replaced by a set of four spaced apart circular openings.

The lower surface of the trough has a blunt nose for diverting the gas toward the openings 16, imparting to it a slight rotational motion which enhances its contact with the liquid on flange 4. Preferably, this nose is somewhat rounded, having a radius of about 0.625 inch.

Figure 3:
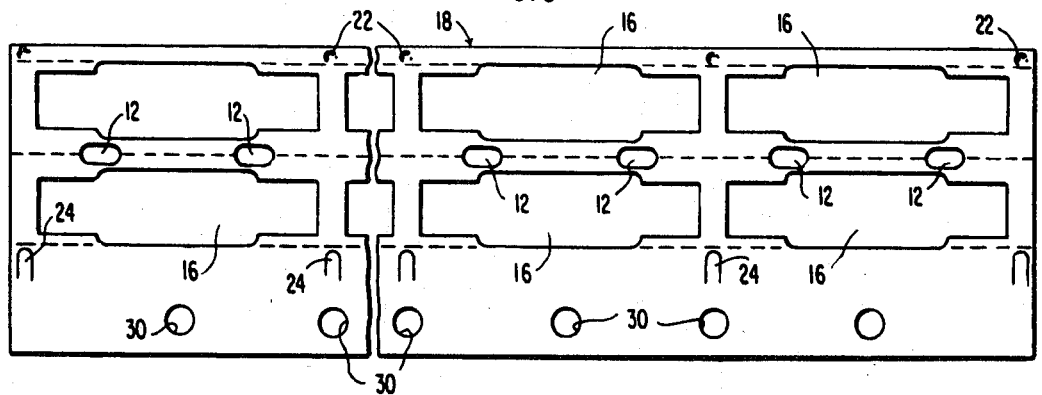

Although each complete grid may be of a unitary nature, it is preferred that it be formed of a set of interconnected discrete members. The structure of one such member for the grids of FIGS. 1, 2 and 5 is best seen in FIGS. 3 and 4 wherein FIG. 3 shows a blank 18 used for forming the member and FIG. 4 shows an upper grid which utilizes such a member when bent to its final configuration. In this drawing, it will be seen that the member has one complete flange 4 and one partial flange 20. On the partial flange 20, there is a set of spaced apart dimples 22. At a corresponding spacing, the complete flange 4 is provided with outstruck tabs 24. As shown in FIG. 5, the tabs 24 provide the flange 4 with two parallel surfaces 26 and 28 which lie in spaced parallel planes and are capable of receiving therebetween the partial flange 20. When the pieces are properly fitted together, the edge portion of the partial flange 20 has one surface bearing against the outer surface 26 of flange 4 and its other surface bearing against the inside surface 28 of the tab. The resilience of the tab 24 holds the dimple 22 in the recess formerly occupied by the tab, thereby preventing inadvertent separation of the members.

In order to promote the distribution of liquid horizontally across the full extent of the upstanding flanges, it is desirable to provide the upstanding flanges with holes 30, best seen in FIG. 4, which are located directly below the drain openings 12 of the next higher grid. The liquid, when arriving at the holes 30, will be diverted laterally so that a larger surface area of the vertical flange will be wetted.

By way of example, a suitably dimensioned apparatus according to the invention may have a transverse distance of 2.25 inches between the upstanding flanges 4 and a corresponding 2.25 inch longitudinal distance between the drain openings 12 in the trough 10. These drain openings 12 have a width of 0.25 inch and a length of 0.5 inch. They are elongated to assure that they will contact the upper edge of the flange 4 of the next lower unit when there is some misalignment or when there are generous fabrication tolerances. The holes 30 in the vertical flanges 4 may have a diameter of about 0.5 inch. The overall height of each segment is about 2.25 inches, and the height of the flange portion thereof is about 1.625 inch. With these dimensions, the apparatus has approximately 40 to 50 distribution points per square meter.

Figure 6:
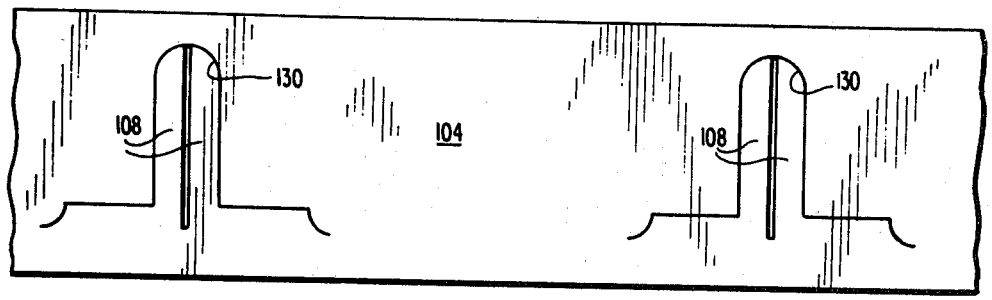
FIG. 6 is a view of a blank used for the manufacture of the present invention which comprises an improvement to the prior embodiment of FIGS. 1–5.
Figure 7:
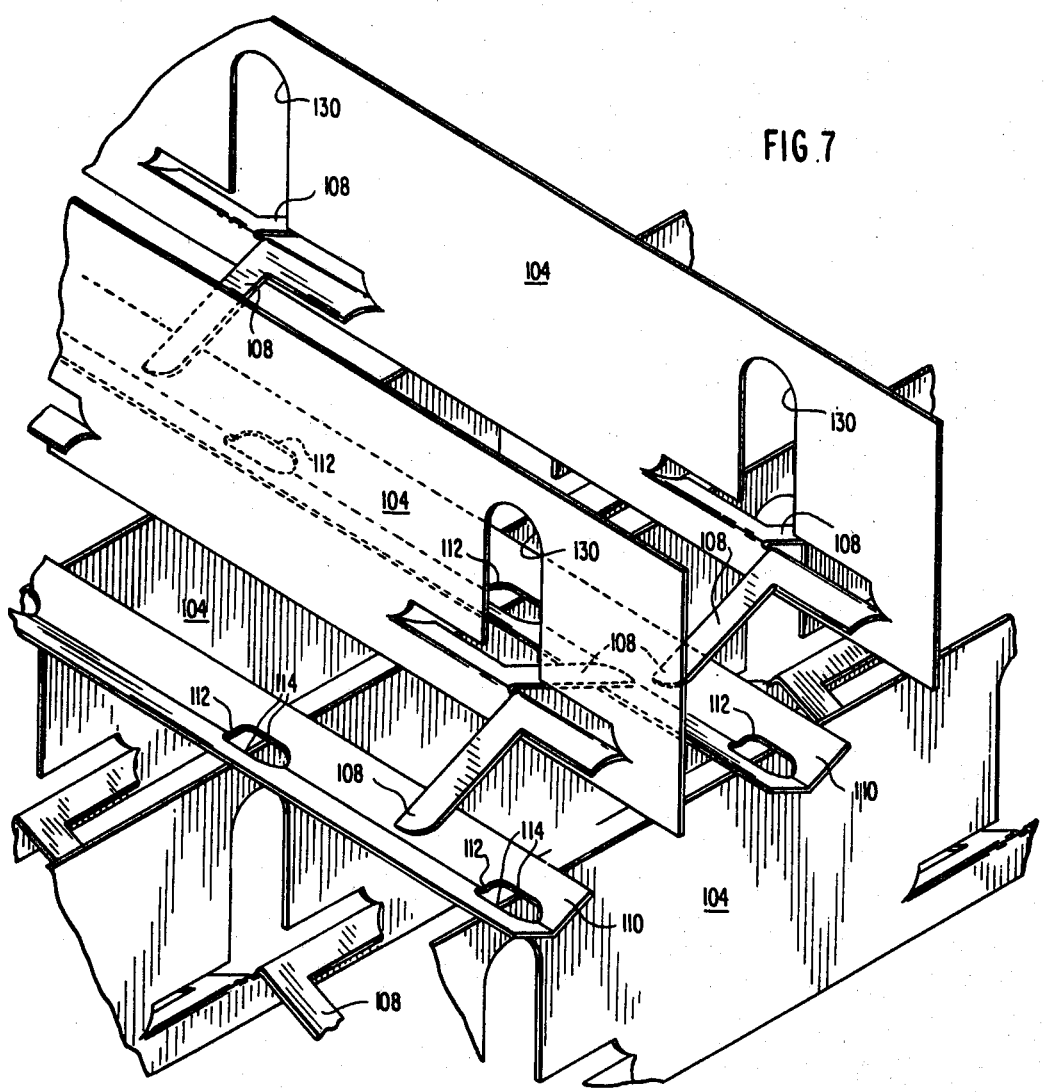
FIG. 7 is a perspective view of an apparatus made in accordance with the invention, utilizing the blank of FIG. 6.

A preferred embodiment of the present invention, shown in FIGS. 6 and 7, has essentially the same proportions, orientation and operating characteristics as the apparatus of FIGS. 1-5, but it is superior in the respect that it requires less material. In this version which is the subject of the present invention, the upstanding flanges 104 and connector portions 108 are integral with each other and are formed from a flat blank such as the one shown in FIG. 6. Prior to the final assembly of a grid, the connector portions 108 are bent outwardly and downwardly from their respective flanges 104. This disposition is shown in FIG. 7, where it will also be noted that the connector portions in each pair extend in opposite directions from their respective flange 104.

Separately formed trough members 110 lie midway between and parallel to the flanges 104. These trough members are spot welded to the outer ends of the connector portions 108, and they are provided with liquid drain openings 112 which release liquid onto the vertical flanges 104 of the next lower grid. The troughs 110 contact the flanges 104 at a number of distribution points 114 where liquid flows directly from an upper trough to the upstanding flanges of a lower grid.

The outward bending of connector portions 108 provides the flanges 104 with openings 130. These openings 130 are located directly below the drain openings 112 of the next higher grid, and they promote the longitudinal distribution of liquid along the flanges.

As in the embodiment of FIGS. 1-5, the structure of FIGS. 6 and 7 provides a large open area for the ascending gas, and the troughs 110 have blunt noses which give the gas a slight rotational movement and divert it toward the openings formed between the elements 104, 108 and 110.

Persons familiar with chemical processing apparatus will recognize that the apparatus will normally be installed in a fractionating tower, with the ends of the grids being trimmed to fit closely against the interior wall of the vessel. To prevent liquid or vapor bypass, it may be necessary to provide a mechanical sealing means around the circumference of each grid. A thin annular split ring of sheet metal having a width of one or two inches may be used between each grid to close off gaps between the vessel wall and the end of the grid segments.

Within the fractionating tower, means are provided for distributing liquid onto the upper end of the packing. A spray nozzle distributor may be used, but it is preferred to use a set of perforated pans or apertured tubes with openings which release streams of liquid onto the grids. Below the grid system, there is provided a means for introducing the gas and a means for withdrawing the liquid. A gas outlet is provided in the vessel at some point above the packing.

Another potential location for this novel packing material would be in connection with random packings such as pall rings, saddles and the like. Two or more stacked grids may be placed directly upon a random packed bed to provide a precisely spaced set of contact points where liquid is distributed into the random packings.

In larger diameter towers, each grid may be formed by a set of panels which have, for example, nine parallel upstanding flanges 4 or 104. The outermost flanges of adjacent panels will be face-to-face against each other. In the FIG. 7 embodiment, the two outermost flanges 104 of each panel will have its connectors 108 bent only inwardly toward the center of the panel. The lower edges of these outermost flanges will lie in a plane which includes the lower surfaces of the troughs 110 of the panel. In this respect, the outermost flanges have their lower edges located somewhat lower than the lower edges of the other flanges 104 of the panel. When such a panel is placed in a tower, the troughs and the lower edges of the two outer panels will be supported by the underlying grid and/or internal supports which are installed in the tower.

I claim:

1. Gas-liquid contact apparatus comprising a plurality of grids arranged in a vertical stack, each grid having a plurality of parallel elongatd upstanding flanges, a plurality of trough portions which lie between said flanges and extend parallel to said flanges, and a plurality of gas openings which are located between the trough portions and the flanges to permit an ascending stream of gas to flow over and in contact with a film of liquid which is disposed on the upstanding flanges, a plurality of connector portions connecting said flanges to the trough portions, said connector portions being integral with and bent outwardly in opposite directions from their respective flange, said trough portions each lying in contact with the upper edges of a plurality of flanges of a grid therebelow, said trough portions having liquid drain openings located where they contact the flanges of a grid therebelow so that liquid in the trough portions will drain gravitationally onto the flanges of the grid therebelow.

2. The apparatus of claim 1 wherein each of the trough portions has a lower surface which is rounded to provide a blunt nose for diverting the ascending gas toward the gas openings.

3. The apparatus of claim 1 or claim 2 wherein the gas openings in each grid have an area which in vertical projection is at least 60% of the total area of the grid in vertical projection.

4. The apparatus of claim 1 wherein each trough portion has its drain openings spaced apart a distance which is equal to the spacing between the upper edges of its upstanding flanges.

5. The apparatus of claim 1 wherein each trough portion is located midway between two of the flanges.

6. The apparatus of claim 1 wherein the upstanding flanges are provided with holes which lie directly below the drain openings of the grid thereabove, said holes being operable to divert liquid across the surface of the flange.

7. Gas-liquid contact apparatus comprising a grid which has a plurality of gas openings for permitting the upward flow of a gas therethrough, said grid being formed of a plurality of segments which extend thereacross, each of said segments having a bottom wall and at least one upstanding flange, said bottom wall being formed of a plurality of connector portions and trough portions, said bottom wall having an upper liquid-supporting surface which is sloped downwardly to a lowermost liquid-releasing distribution point, said connector portions being integral with said flanges and being bent outwardly therefrom in opposite directions, said distribution point being in contact with an upper edge of an upstanding flange of a grid therebelow so that liquid from the distribution point will flow onto the upstanding flange therebelow, said bottom wall including said gas openings, said connector portions being located where they will be struck by liquid which may fall through the openings of the grids thereabove, said connector portions sloping downwardly to the liquid-releasing zone in order to carry to the distribution points the liquid which strikes the connector portions and the liquid which flows onto the connector portions from the upstanding flange.

8. The apparatus of claim 7 wherein said trough portions have lower surfaces which are rounded to provide blunt noses for diverting the ascending gas toward the gas openings.

9. The apparatus of claim 7 or claim 8, wherein the gas openings in each grid have an area which in vertical projection is at least 60% of the total area of the grid in vertical projection.

10. The apparatus of claim 7 wherein each segment has the distribution points spaced apart a distance which is equal to the spacing between two upstanding flanges.

11. The apparatus of claim 7 wherein each distribution point is located midway between two of the flanges.

12. The apparatus of claim 7 wherein the upstanding flanges are provided with holes which lie directly below the distribution points of the grid thereabove, said holes being operable to divert the film of liquid across the surface of the flange.

13. Gas-liquid contact apparatus comprising a plurality of grids arranged in a vertical stack, each of said grids including a plurality of segments which have longitudinal axes which are parallel to each other and are angularly turned relative to the segments in the grid therebeneath, each of said segments having a trough portion, a flange portion and connector portions, said trough portions extending longitudinally of their respective segments and being provided with a first set of spaced apart openings which are drain openings for the gravitational drainage of liquid therefrom, said flange portions having an upstanding orientation and extending longitudinally of their respective segments, said flange portions being spaced from the trough portions of their respective segments and having surfaces for supporting thereon a downwardly flowing film of liquid, said connector portions being longitudinally spaced apart on their respective segments, said connector portions sloping downwardly from the flange portions to the trough portions and having surfaces for carrying liquid from the flange portions to the trough portions, said connector portions being integral with the flange portions and being bent outwardly therefrom in opposite directions, said connector portions having outer ends connected to said trough portions, said segments having, between the spaced apart connector portions, a second set of openings which are gas openings which permit a stream of gas to pass upwardly through the segment in contact with the liquid on the wall portions, said drain openings in each grid having edges which lie in contact with the flange portions of the grid therebeneath so that liquid will flow from the troughs of one grid onto the upstanding flanges of the grid therebeneath.

14. The apparatus of claim 13 wherein each of the trough portions has a lower surface which is rounded to provide a blunt nose for diverting the ascending gas toward the gas openings.

15. The apparatus of claim 13 or claim 14, wherein the gas openings in each grid have an area which in vertical projection is at least 60% of the total area of the grid in vertical projection.

16. The apparatus of claim 13 wherein each trough portion has its drain openings spaced apart a distance which is equal to the spacing between the upper edges of its upstanding flange portions.

17. The apparatus of claim 13 wherein each trough portion is located midway between two of the flange portions.

18. The apparatus of claim 17 wherein each of the trough portions has a lower surface which is rounded to provide a blunt nose for diverting the ascending gas toward the gas openings.

19. The apparatus of claim 13 wherein the upstanding flange portions are provided with holes which lie directly below the drain openings of the grid thereabove, said holes being operable to divert the film of liquid across the surface of the flange portions.

* * * * *